United States Patent [19]
Diepstraten

[11] Patent Number: 6,130,932
[45] Date of Patent: Oct. 10, 2000

[54] IMAGE PICK-UP APPARATUS AND X-RAY EXAMINATION APPARATUS INCLUDING A CORRECTION SYSTEM

[75] Inventor: Leonardus J. M. Diepstraten, Eindhoven, Netherlands

[73] Assignee: U.S. Philips Corporation, New York, N.Y.

[21] Appl. No.: 09/113,961

[22] Filed: Jul. 10, 1998

[30] Foreign Application Priority Data

Jul. 11, 1997 [EP] European Pat. Off. ............... 97202139

[51] Int. Cl.$^7$ .................................................. H04N 1/00
[52] U.S. Cl. ....................................... 378/98.7; 378/98.12
[58] Field of Search ................................. 378/98.7, 98.12

[56] References Cited

U.S. PATENT DOCUMENTS

| | | | |
|---|---|---|---|
| 5,541,974 | 7/1996 | Sklebitz | 378/98.12 |
| 5,602,402 | 2/1997 | Yasuda | 250/587 |
| 5,602,896 | 2/1997 | Diepstraten | 379/98.7 |
| 5,778,044 | 7/1998 | Bruijns | 378/98.7 |

FOREIGN PATENT DOCUMENTS

WO9323952 11/1993 WIPO.

*Primary Examiner*—Craig E. Church
*Attorney, Agent, or Firm*—Dwight H. Renfrew

[57] ABSTRACT

The image pick-up apparatus includes a plurality of image sensors (2, 3) for picking up sub-images by deriving sub-image signals from sub-images and also a correction system (4, 43, 44, 45) for deriving corrected brightness values from brightness values of the sub-images and a correction signal. The correction system is provided with a light source (4), for example a LED, for exposing at least one of the image sensors in order to generate one or more measurement signals from the exposed image sensor or sensors. The correction system is arranged to derive the correction signal from the one or more measurement signals. An image pick-up apparatus of this kind is used, for example in an X-ray examination apparatus.

14 Claims, 3 Drawing Sheets

IMAGE PICK-UP APPARATUS AND X-RAY EXAMINATION APPARATUS INCLUDING A CORRECTION SYSTEM

BACKGROUND OF THE INVENTION

1. Field of the Invention

The invention relates to an image pick-up apparatus which includes

- a plurality of image sensors for picking up sub-images, and
- a correction system for deriving corrected brightness values from brightness values of the sub-images and a correction signal.

The invention also relates to an X-ray examination apparatus.

2. Description of the Related Art

An image pick-up apparatus and an X-ray examination apparatus are known from the international application WO 97/00573, which is incorporated herein by reference in its entirety and for all purposes.

The known X-ray examination apparatus includes an X-ray source and an X-ray image intensifier whereto the image pick-up apparatus is optically coupled. An X-ray image is formed of an object, for example a patient to be radiologically examined who is arranged between the X-ray source and the X-ray image intensifier, by irradiating the object by means of an X-ray beam emitted by the X-ray source. The X-ray image is formed on an entrance screen of the X-ray image intensifier and converted into an optical image on an exit window of the X-ray image intensifier. The optical image is picked up by the image pick-up apparatus and converted into an electronic image signal. The light emanating from the exit screen is split into two sub-images by means of an image splitter which includes a partly transparent mirror, said sub-images being picked up by respective image sensors.

The known image pick-up apparatus includes two solid state image sensors, each of which comprises a plurality of photosensitive elements. The known image pick-up apparatus also includes a combination unit for deriving a composite image signal from the sub-image signals. The image sensors are arranged in such a manner that pixels of the optical image which are picked up by one image sensor will be situated in the intermediate spaces between the photosensitive sensor elements of the other image sensor. Each image sensor picks up a respective sub-image and applies a respective sub-image signal to the combination unit which forms a composite image signal for a composite image from said sub-image signals. From the sub-images the image sensors derive electronic sub-image signals having signal levels which represent brightness values in the sub-images. The composite image is formed by way of the corrected brightness values of the sub-images. The composite image is composed, for example of image lines of the sub-images which have been picked up by the individual sensors, for example in such a manner that image lines from one image sensor constitute the odd image lines of the composite image and image lines from the other image sensor constitute the even image lines in the composite image. In the direction transversely of the image lines the composite image has a spatial resolution which has approximately been doubled in comparison with the sub-images picked up by the individual sensors.

Differences are liable to occur between brightness values of image lines from different image sensors, for example due to differences between the sensitivities of individual image sensors. The sensitivity of such an image sensor is represented by the ratio of the intensity of the light incident on the image sensor to the signal level of the image signal produced by the light in the image sensor. Such differences between the sensitivities of individual image sensors may cause disturbances in the composite image if no correction is made for differences between the sensitivities of the individual image sensors. The composite image may exhibit, for example a streaky pattern which is not at all related to the image information in the optical image but is caused by unequal sensitivities of the individual image sensors. The known image pick-up apparatus includes a correction system for correcting the brightness values of the sub-images for such differences, thus avoiding the occurrence of disturbances in the composite image which are caused by differences between the sensitivities of individual image sensors. The accuracy of the correction of the brightness values of the sub-images is dependent on the optical image. This is because the correction system of the known image pick-up apparatus derives the correction signal from a bright part of the optical image. Accurate correction can be achieved only when an optical image is available which contains a rather large part of considerable brightness.

SUMMARY OF THE INVENTION

It is an object of the invention to provide an image pick-up apparatus which includes a correction system which enables more accurate correction of brightness values of the sub-images so as to form the composite image signal therefrom.

This object is achieved by means of an image pick-up apparatus according to the invention which is characterized in that

- the correction system includes a light source for illuminating at least one of the image sensors in order to generate one or more measurement signals from the illuminated image sensor (sensors), and
- the correction system is arranged to derive the correction signal from the one or more measurement signals.

When, using the light source, a pre-determined one of the image sensors is exposed to a light intensity which is known in advance, a measurement signal is generated which represents the current sensitivity of the exposed image sensor. The correction system derives the correction signal from the current sensitivity of the exposed image sensor and the relative sensitivities of the other image sensors relative to the exposed image sensor. The sensitivities of the other, non-exposed image sensors relative to the sensitivity of the exposed image sensor can be readily measured by means of a separate calibration measurement. Such a calibration measurement need be performed only once. For example, such a calibration measurement can be performed by picking up an image of uniform brightness by means of the individual image sensors. It has been found that the variation of the relative differences between sensitivities of the individual image sensors is accurately reproducible, for example as a function of the temperature. As a result, the measurement signal also represents the current sensitivities of the non-exposed image sensors. It appears that the brightness values of the sub-images can be corrected by means of the correction system, utilizing the signal level of the measurement signal and the results of the calibration measurement.

When a plurality of the image sensors are exposed by means of the light source, the individual image sensors generate measurement signals which represent the individual sensitivities of the various image sensors. The correction system corrects the brightness values of the sub-images by way of the signal levels of the measurement signals. When a plurality of image sensors are exposed, no separate calibration measurement will be required so as to measure the relative sensitivities of individual image sensors relative to one of the image sensors.

The correction signal represents, for example ratios of sensitivities of individual image sensors and the correction system derives corrected brightness values by multiplying signal levels of the sub-image signals by the relevant ratios. The measurement signals, notably from a plurality of image sensors, also indicate faults in the image sensors, for example faulty sensor elements. Hence, the correction signal is also suitable for correcting brightness values of the sub-images also for such faults. The sub-image signals are thus corrected and by composing the composite image signal by way the corrected sub-image signals it is achieved that disturbances in the composite image signal are counteracted. The composite image is formed by way of the corrected brightness values of the sub-images. As the corrections are smaller, they can be more accurately performed. The image pick-up apparatus also includes a combination unit for deriving a composite image signal for the composite image from the sub-image signals.

When the composite image signal is composed from the sub-image signals, the composite image signal can be corrected by multiplying signal levels of the composite image signal by the relevant ratio. The signal levels of the composite image signal represent a respective brightness value of one of the sub-images. The correction system thus corrects brightness values of the sub-images by multiplying signal levels of the sub-image signals themselves, or signal levels of the composite image containing the sub-image signals, by values of the correction signal. Thus, disturbances caused by differences between the sensitivities of the image sensors are avoided in the composite image. As a result, small details can be suitably visibly reproduced in the composite image.

Because the composite image signal is corrected for differences between sensitivities of different image sensors, it is not necessary that all image sensors have exactly the same sensitivity. This means that the permissible tolerances as regards the sensitivity of the image sensors may be comparatively wide, allowing for the use of comparatively inexpensive image sensors in the image pick-up apparatus according to the invention.

Preferably, the light source is a light-emitting diode. Such a light-emitting diode (LED) emits light having a stable color and intensity. It is thus achieved that the measurement signal accurately represents the sensitivity of the exposed image sensor (sensors). Use is preferably made of a LED which emits light having a wavelength which is approximately equal to that of the light of the sub-images.

When the light source, such as an LED, is mounted on the beam splitter it is achieved that the image sensors are exposed in comparable circumstances, possibly with the exception of wavelength and intensity differences of the light emitted by the light source, during the exposure by means of the light source and during the picking up of the sub-images. The image sensors are notably exposed at substantially the same angle of incidence during exposure by means of the light source and during the picking up of the sub-images. It is easy to take into account the fact that the image sensors which are exposed in reflection from a reflector of the beam splitter by the light source are exposed in transmission by said reflector during picking up of the sub-images (and vice versa). Furthermore, the light source can be oriented in such a manner that it emits a light beam to the beam splitter at an angle other than light beams representing the sub-images. As a result, the light source will not obstruct the picking up of the sub-images.

A high accuracy of the correction signal is achieved by taking into account differences between the circumstances in which the image sensors are exposed during exposure by the light source and during the picking-up of the sub-images. Using such an accurate correction signal, a composite image signal can be derived which is substantially free from disturbances due to differences between sensitivities of different image sensors. The different circumstances relate notably to the wavelength (color) and intensity of the light of the light source and of the light of the sub-images.

As an alternative, the correction system is arranged to derive the correction signal from the temperature of at least one of the image sensors. The temperature of the image sensors essentially determines the sensitivities of the image sensors. The sensitivity of the image sensors can thus be derived from their temperature. For example, the image sensors can be readily calibrated in advance; the sensitivity of such an image sensor is then measured as a function of the temperature and the calibration result is taken up in a table, for example an electronic look-up table. For example, the temperature of a plurality of image sensors can be individually measured and the sensitivity of the image sensors can be derived from this temperature measurement. Alternatively, the temperature of a single image sensor can be measured. This is because it has been found that during operation of the image pick-up apparatus all image sensors have substantially the same temperature or that at least temperature differences between individual image sensors are substantially constant. Such temperature differences can be readily measured. The calibration of the image sensors is preferably performed when the image sensors have been mounted in the image pick-up apparatus; the temperature differences occurring during operation can then also be measured. When the measured temperature differences are taken into account for the calibration result, it suffices to measure the current temperature of a single image sensor so as to derive the correction signal therefrom. The image pick-up apparatus includes a combination unit for deriving a composite image signal from the sub-image signals.

The correction signal is preferably derived from the current strength of the dark current of at least one of the image sensors.

The dark current of an image sensor is very sensitive to the temperature of the image sensor. The dark current is generated mainly by thermally excited charge carriers. As a result, the current strength of the dark current accurately represents the temperature of the image sensor. The dark current is measured by reading out the image sensor while no or hardly any light is or has been incident on the image sensor for some time before reading out, so that practically exclusively thermally excited charge carriers are read out.

An X-ray examination apparatus according to the invention is provided, for example with an X-ray detector for deriving an optical image from an X-ray image and with an image pick-up apparatus as according to this invention for deriving an image signal from the optical image.

The optical image represents the image information in the X-ray image. When the optical image is picked up by means of the image pick-up apparatus according to the invention, a composite image signal is generated whereby the image information of the X-ray image can be reproduced with a high diagnostic quality; this means that small details of low contrast in the X-ray image are suitably visibly reproduced in the composite image. Such a composite image of high diagnostic quality constitutes a suitable technical aid for a physician, for example a radiologist, in making a reliable diagnosis.

Another embodiment of an X-ray examination apparatus according to the invention includes a plurality of X-ray detectors for picking up sub-images by deriving sub-image signals from an X-ray image, and a correction system for deriving corrected brightness values from brightness values of the sub-images and a correction signal, the correction system including a light source for exposing at least one of the X-ray detectors so as to generate one or more measurement signals from the exposed X-ray detector (detectors), the correction system being arranged to derive the correction signal from the one or more measurement signals.

The X-ray detectors are provided with a conversion layer, for example a thallium-doped cesium-iodide layer in which light is generated by incident X-rays. The X-ray detectors also include photosensitive elements, for example photodiodes, for deriving electric charges from the light of the conversion layer. The electric charges of the individual X-ray detectors are used to form the sub-image signals. When one or more X-ray detectors are exposed to light from the light source, preferably one or more LEDs, electric charges are produced in the photosensitive elements, one or more measurement signals being derived from said charges. The signal levels of the measurement signals represent the sensitivities of the individual X-ray detectors. When the relative sensitivities of the X-ray detectors relative to the exposed X-ray detector are measured during a separate calibration measurement, it suffices to expose only a single X-ray detector by means of the X-ray source and to derive the correction signal from the results of the calibration measurement and the signal level of the measurement signal. Preferably, use is made of an LED which emits light having approximately the same wavelength as the light generated in the conversion layer by incident X-rays. The X-ray examination apparatus also includes a combination unit for deriving a composite image signal for a composite image from the sub-image signals.

These and other aspects of the invention will be apparent from and elucidated with reference to the embodiments described hereinafter.

DETAILED DESCRIPTION OF THE PREFERRED EMBODIMENT

Figure 1:
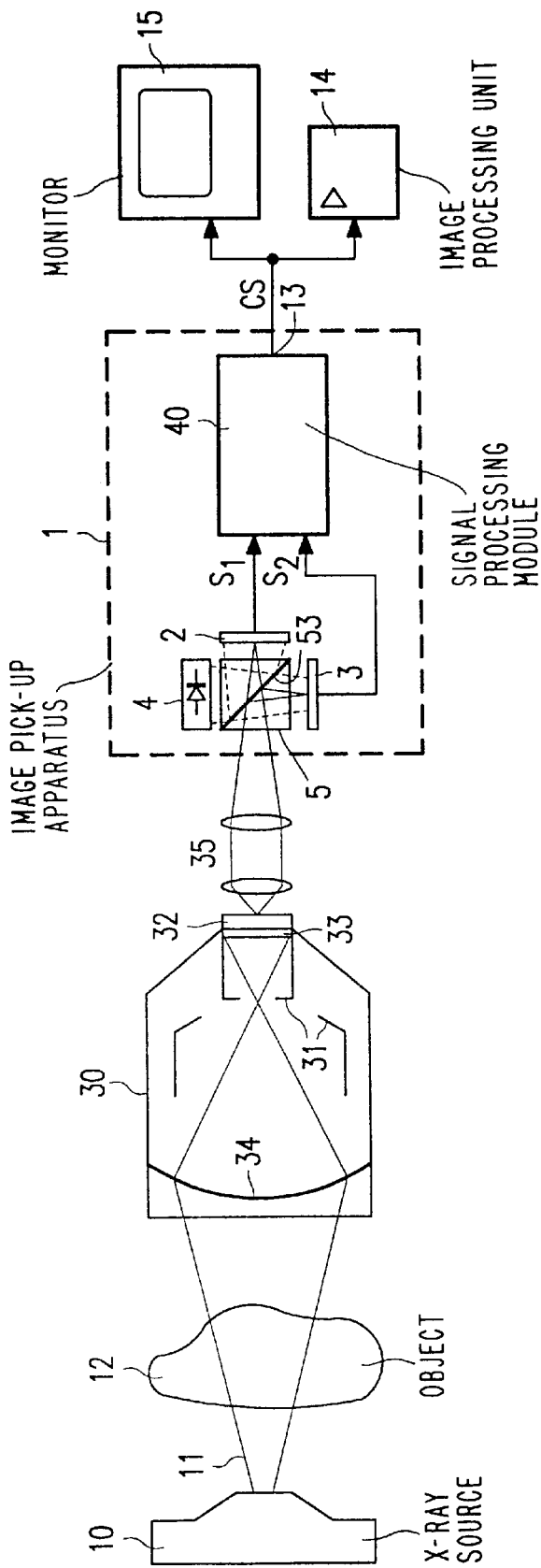
FIG. 1 is a diagrammatic representation of an embodiment of an X-ray examination apparatus according to the invention.

FIG. 1 is a diagrammatic representation of an embodiment of an X-ray examination apparatus according to the invention. The X-ray source 10 emits an X-ray beam 11 which irradiates an object 12, for example a patient to be examined radiologically. Due to differences in X-ray absorption within the patient, an X-ray image is formed on an entrance screen 34 of the X-ray image intensifier 30. The X-rays incident on the entrance screen are converted into photo-electrons which are guided to an exit window 32 by an electron optical system 31. The photo-electrons generate an optical image on a phosphor layer 33 on the exit window 32, which optical image is picked up by the image pick-up apparatus 1. Via a signal output 13, the image pick-up apparatus applies an electronic video signal (CS) to a monitor 15 on which the image information of the X-ray image is visualized, or to an image processing unit 14 for further processing of the image signal.

The optical image on the exit window 32 is imaged on two image sensors 2, 3 by a lens system 35 and the beam splitter 5. The image sensors are, for example CCD sensors which comprise a large number of photosensitive elements and are positioned relative to the beam splitter 5 in such a manner that pixels in the optical image which are imaged on photosensitive elements of one image sensor are imaged in intermediate spaces between photosensitive elements of the other image sensor. For example, the beam splitter comprises a pair of splitting prisms 51, 52 whose oblique sides 53 are arranged one against the other. The oblique sides 53 constitute a partly transparent reflector. For example, the individual image sensors pick up alternating bands of the optical image. Each image sensor supplies an electronic sub-image signal (IS) with signal levels representing brightness values in the sub-images. The sub-image signals (IS) are combined in the signal processing module 40 so as to form a composite image signal (CIS) in the form of the electronic video signal whose signal levels represent brightness values for the composite image. The image pick-up apparatus 1 supplies the electronic video signal for the composite image with a high resolution so as to enable suitably visible reproduction of image information in a medical X-ray image containing small details.

Figure 2:
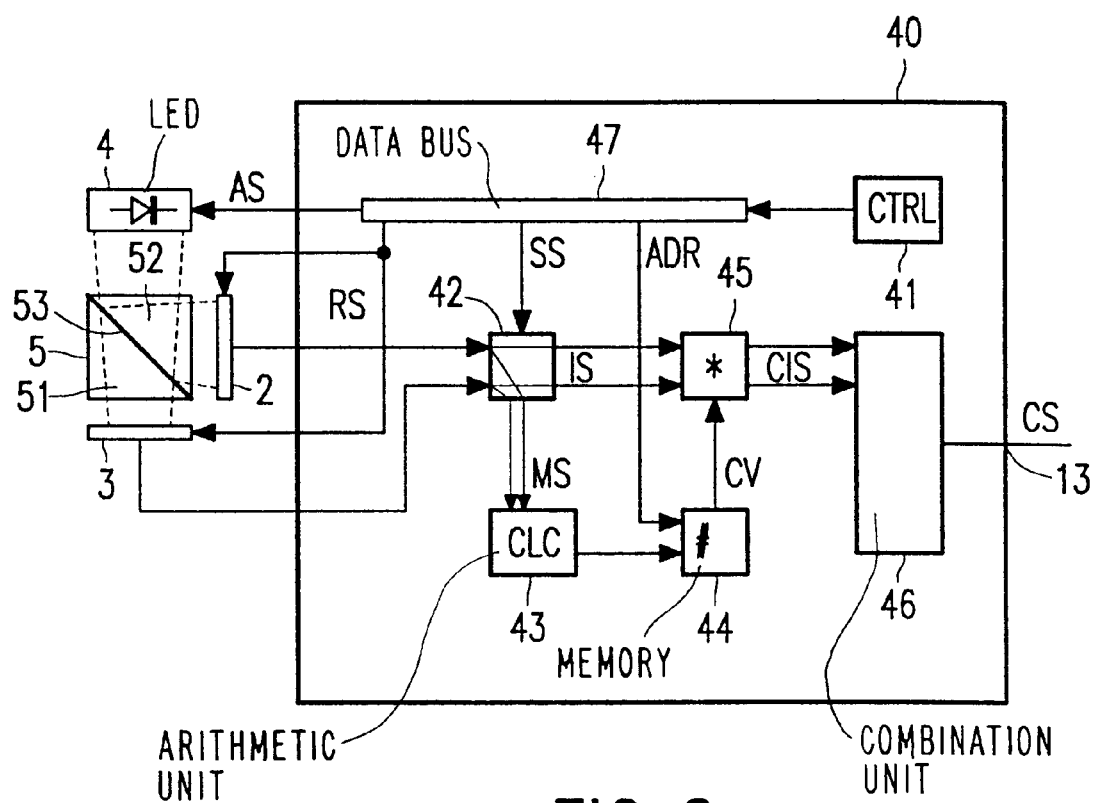
FIG. 2 is a diagrammatic representation of an image pick-up apparatus according to the invention.

FIG. 2 is a diagrammatic representation of an image pick-up apparatus according to the invention. The image pick-up apparatus 1 includes a light-emitting diode 4 which exposes the image sensors 2,3 so as to generate the measurement signals. In order to generate the measurement signals (MS), the LED 4 is activated by a control unit 41 by application of an activation signal (AS) to the LED. For example, the activation signal applies a direct voltage of forward polarity to the LED so that the LED starts to emit light. Under the influence of the light from the LEDs, the image sensors generate measurement signals. Alternatively, it is possible to measure the dark current of the image sensors by applying a read out signal (RS) to the image sensors when the image sensors are not exposed. The current intensities of the dark current supplied by the image sensors then act as measurement signals. The measurement signals generated by the image sensors 2,3 are applied to an arithmetic unit 43, via a switching unit 42. The switching unit is also controlled by the control unit 41. To this end, the control unit applies a switching signal (SS) to a control input of the switching unit. For example, the switching unit includes one or more transistors which are opened and closed on the basis of electric voltages present at the gate contacts of said transistors. The switching unit 42 sends the measurement signals (MS) from the image sensors 2,3 to the authentic unit and sends the subimage signals (IS) from the image sensors 2,3 to a multiplier 45. The control unit 41 is, for example an electronic (micro)processor. On the basis of the signal levels of the measurement signals, the arithmetic unit 43 calculates correction values which represent differences between sensitivities of the image sensors per photosensitive sensor element. The arithmetic unit calculates ratios of the signal levels of the measurement signals which relate to the sensor elements of the image sensors. From these ratios the arithmetic unit 43 calculates correction values while taking into account differences between the circumstances in which the image sensors are exposed by the light source and those during the picking-up of the sub-images. The method of calculating the correction values from the ratios of the signal levels of the measurement signals by the arithmetic unit is determined experimentally. To this end, for example sub-images of uniform brightness are picked up and the arithmetic unit is adjusted so that the electronic video signal represents an image of uniform brightness. The adjustment of the arithmetic unit concerns the suitable programming of the arithmetic unit. The correction values generated by the arithmetic unit are stored in a memory unit 44. When the stored correction values are used, it is not necessary to calculate the correction values again and again. Using a multiplier 45, for example an adjustable signal amplifier, the signal levels of the sub-image signals 15 are multiplied by the relevant correction values (CV) so as to form corrected sub-image signals (CIS). The signal levels of the corrected sub-image signals represent the corrected brightness values of the sub-images. The correction values form the signal levels of the correction signal. The corrected sub-image signals (CIS) are applied to the combination unit 46. On the basis of the corrected sub-image signals the combination unit 46 forms the composite image signal in the form of the electronic video signal which is available at the signal output 13 of the signal processing module 40. The reading out of the memory unit 44 while ensuring that the relevant correction value is applied to the multiplier 45 at the appropriate instant is controlled by an address signal (ADR) which is generated by the control unit 41 and applied to an address input of the memory unit 44.

The control unit 41 is connected via a data bus 47 to various components of the correction system. The various signals supplied by the control unit so as to control the signal processing module 40, the image sensors and the LED are communicated via said data bus. The correction system includes the light source 4, the arithmetic unit 43, the storage unit 44 and the multiplier 45.

It is also possible, using the combination unit, to combine first the sub-image signals representing the non-corrected brightness values of the sub-images, followed by multiplication of the signal levels of the composite image signal by the relevant correction values so as to form the composite image signal.

Figure 3:
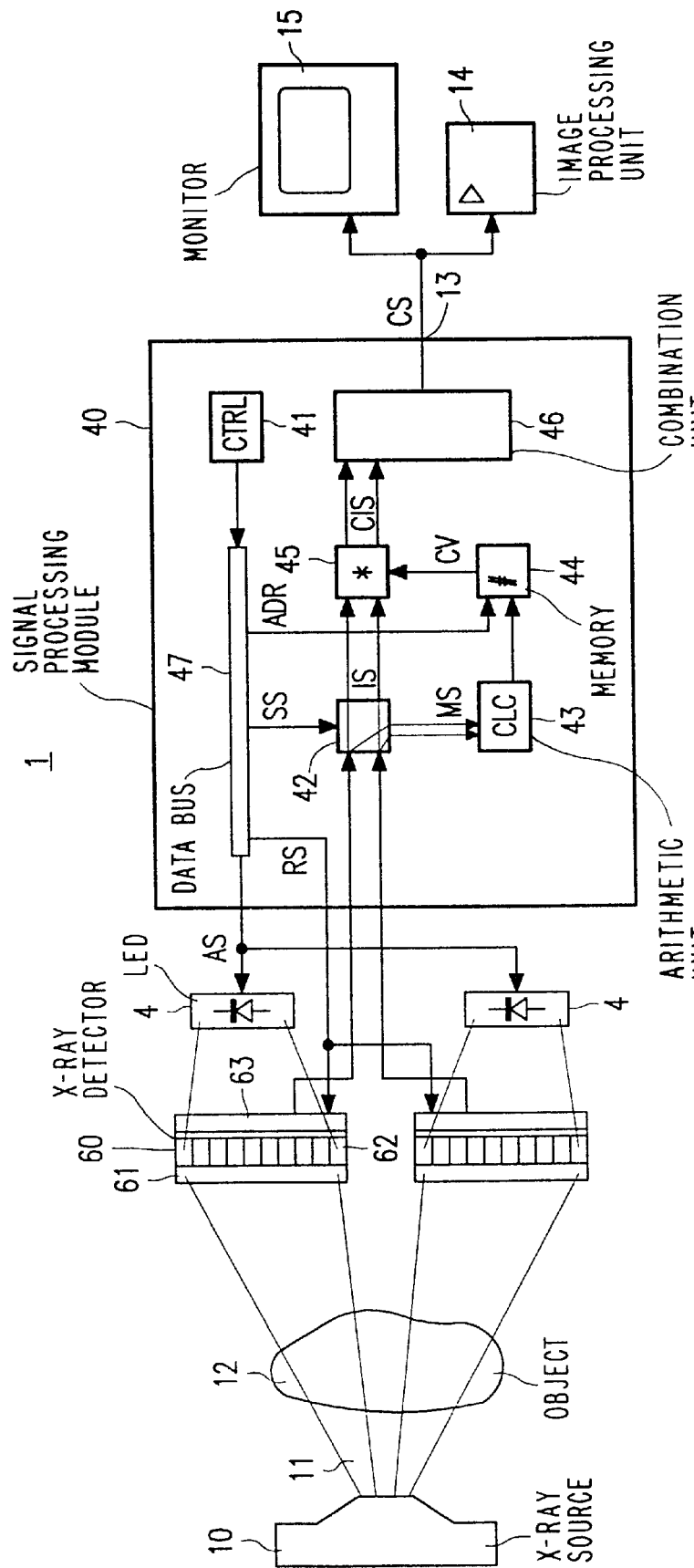
FIG. 3 is a graphic representation of another embodiment of an X-ray examination apparatus according to the invention.

FIG. 3 shows diagrammatically a further embodiment of an X-ray examination apparatus according to the invention. Using several X-ray detectors 60, sub-images of an X-ray image are formed on the basis of local differences in the absorption of the X-rays 11 in the object 12 to be examined. Each of the X-ray detectors 60 is, for example an X-ray-sensitive sensor matrix which comprises a large number of photosensitive elements 62, for example photodiodes, which are arranged in a matrix. A CsI:T1 conversion layer 61 converts the incident X-rays into low-energetic radiation, notably green light, to which the photodiodes 62 are sensitive. Furthermore, each of the X-ray detectors 60 includes a read-out circuit 63 for reading out the electric charges generated in the photosensitive elements 62 and for deriving the sub-image signals therefrom. X-ray detectors of this kind are known as such, for example from French patent application FR 2 593 343. The control unit 41 activates the light sources 4 so as to expose the photosensitive elements, with the result that electric charges are generated therein by the light of the light source. The measurement signals are derived from the electric charges from the individual X-ray detectors. To this end, the control unit 41 applies read-out signals (RS) to the read-out circuits 63 of the X-ray detectors 60. The correction signal is derived from the measurement signals (MS) and used to derive corrected brightness values from the sub-images by the signal processing module 40. The operation of the signal processing module is analogous to that of the signal processing module described with reference to FIG. 2. Preferably, substantially identical LEDs 4 are used or use is made of a single LED which is arranged in such a manner that both X-ray detectors can be exposed thereby.

In an X-ray examination apparatus or an image pick-up apparatus according to this invention, the functions of the signal processing module are preferably carried out by an appropriately programmed computer or by a special purpose (micro)processor.

What is claimed is:

1. An image pick-up apparatus comprising:

a plurality of image sensors for picking up sub-images comprising brightness values, and a correction system for deriving corrected brightness values from the picked-up brightness values of the sub-images and a correction signal, wherein the correction system further comprises a light source for exposing at least a pre-determined one of the image sensors in order to generate a measurement signal from the pre-determined image sensor, and the correction system is arranged to derive the correction signal from (i) the measurement signal, and from (ii) a plurality of pre-determined sensitivity differences, each sensitivity difference being between the sensitivity of one of the plurality of image sensors and the sensitivity of the pre-determined image sensor.

2. An image pick-up apparatus as claimed in claim 1 wherein the light source is a light-emitting diode.

3. An image pick-up apparatus as claimed in claim 1 further comprising a beam splitter for distributing an incident light beam to at least the pre-determined image sensor, wherein the light source is mounted on the beam splitter.

4. The apparatus of claim 1 wherein the correction signal represents ratios of sensitivities of each of the plurality of image sensors, and wherein the correction system derives corrected brightness values by multiplying the picked-up brightness values by the relevant ratios.

5. The apparatus of claim 1 wherein the plurality of pre-determined sensitivity differences is obtained by a separate calibration measurement performed only once.

6. An image pick-up apparatus comprising:

a plurality of image sensors for picking up sub-images comprising brightness values, and a correction system for deriving corrected brightness values from the picked-up brightness values of the sub-images and a correction signal, wherein the correction system further comprises a light source for exposing all of the image sensors in order to generate a single measurement signal from each of the image sensors, and the correction system is arranged to derive the correction signal from the single measurement signal from each of the plurality of image sensors.

7. The apparatus of claim 6 wherein the correction signal represents ratios of sensitivities of each of the plurality of image sensors, and wherein the correction system derives corrected brightness values by multiplying the picked-up brightness values by the relevant ratios.

8. An X-ray examination apparatus which includes a X-ray source for generating an X-ray image, a plurality of X-ray detectors for picking up sub-images by deriving sub-image signals comprising brightness values from the X-ray image, and a correction system for deriving corrected brightness values from the picked-up brightness values of the sub-images and a correction signal, wherein the correction system further comprises a light source for exposing at least a pre-determined one of the X-ray detectors in order to generate a measurement signal from the pre-determined X-ray detector, and the correction system is arranged to derive the correction signal from (i) the measurement signal, and from (ii) a plurality of pre-determined sensitivity differences, each sensitivity difference being between the sensitivity of one of the plurality of X-ray detectors and the sensitivity of the pre-determined X-ray detector.

9. An X-ray examination apparatus comprising:

a X-ray source for generating an X-ray image, an X-ray detector for deriving an optical image from an X-ray image, and an image pick-up apparatus, wherein the image pick-up apparatus further comprises a plurality of image sensors for picking up sub-images comprising brightness values from the optical image, and a correction system for deriving corrected brightness values from the picked-up brightness values of the sub-images and a correction signal, wherein the correction system is arranged to derive the correction signal from (i) the temperature of a pre-determined one of the image sensors, and from (ii) a plurality of pre-determined sensitivity differences, each sensitivity difference being between the sensitivity of one of the plurality of image sensors and the sensitivity of the pre-determined image sensor.

10. An X-ray examination apparatus comprising:

a X-ray source for generating an X-ray image, an X-ray detector for deriving an optical image from the X-ray image, and an image pick-up apparatus, wherein the image pick-up apparatus further comprises a plurality of image sensors for picking up sub-images comprising brightness values from the optical image, and a correction system for deriving corrected brightness values from the picked-up brightness values of the sub-images and a correction signal, wherein the correction system further comprises a light source for exposing at least a pre-determined one of the image sensors in order to generate a measurement signal from the pre-determined image sensor, and the correction system is arranged to derive the correction signal from (i) the measurement signal, and from (ii) a plurality of pre-determined sensitivity differences, each sensitivity difference being between the sensitivity of one of the plurality of image sensors and the sensitivity of the pre-determined image sensor.

11. An image pick-up apparatus comprising:

a plurality of image sensors for picking up sub-images comprising brightness values, and a correction system for deriving corrected brightness values from picked-up brightness values of the sub-images and a correction signal, wherein the correction system is arranged to derive the correction signal from (i) the temperature of a pre-determined one of the image sensors, and from (ii) a plurality of pre-determined sensitivity differences, each sensitivity difference being between the sensitivity of one of the plurality of image sensors and the sensitivity of the pre-determined image sensor.

12. An image pick-up apparatus as claimed in claim 11 wherein the correction system is further arranged to derive the correction signal from the strength of a dark current of the pre-determined image sensor.

13. The apparatus of claim 11 wherein the correction signal represents ratios of sensitivities of each of the plurality of image sensors, and wherein the correction system derives corrected brightness values by multiplying the picked-up brightness values by the relevant ratios.

14. The apparatus of claim 11 wherein the plurality of pre-determined sensitivity differences is obtained by a separate calibration measurement performed only once.

* * * * *